United States Patent
Duan et al.

(10) Patent No.: US 10,102,247 B2
(45) Date of Patent: Oct. 16, 2018

(54) PRECISION ADAPTIVE VEHICLE TRAJECTORY QUERY PLAN OPTIMIZATION

(71) Applicant: International Business Machines Corporation, Armonk, NY (US)

(72) Inventors: Ning Duan, Beijing (CN); Peng Ji, Nanjing (CN); Zhi H. Wang, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 14/870,203

(22) Filed: Sep. 30, 2015

(65) Prior Publication Data
US 2017/0091272 A1    Mar. 30, 2017

(51) Int. Cl.
*G06F 17/30* (2006.01)

(52) U.S. Cl.
CPC .. *G06F 17/30463* (2013.01); *G06F 17/30241* (2013.01)

(58) Field of Classification Search
USPC .................................................. 707/706, 718
See application file for complete search history.

(56) References Cited

U.S. PATENT DOCUMENTS

| | | | | |
|---|---|---|---|---|
| 6,052,693 A * | 4/2000 | Smith | ............... | G06F 17/30917 |
| 6,873,911 B2 * | 3/2005 | Nishira | ............... | B60T 7/16 |
| | | | | 340/436 |
| 9,804,892 B2 * | 10/2017 | Park | ............... | G06F 9/505 |
| 2007/0271035 A1 * | 11/2007 | Stoschek | ............... | G01C 21/3682 |
| | | | | 701/533 |
| 2012/0143365 A1 * | 6/2012 | McIver | ............... | G06Q 10/06 |
| | | | | 700/105 |
| 2014/0237496 A1 * | 8/2014 | Julian | ............... | H04N 21/44213 |
| | | | | 725/13 |

OTHER PUBLICATIONS

Boulmakoul, Azedine et al., "Moving Object Trajectories Meta-Model and Spatio-Temporal Queries", International Journal of Database Management Systems (IJDMS) vol. 4, No. 2, Apr. 2012. 20 pages.

Shang, Shuo et al., "Personalized Trajectory Matching in Spatial Networks", The VLDB Journal, DOI 10.1007/s00778-013-0331-0, Jul. 18, 2013, 20 pages.

* cited by examiner

*Primary Examiner* — Kim Nguyen
(74) *Attorney, Agent, or Firm* — Stephen R. Tkacs; Stephen J. Walder, Jr.; Vazken Alexanian

(57) ABSTRACT

A mechanism is provided in a data processing system for precision adaptive trajectory query plan optimization. The mechanism identifies precision needs based on query instances and maps trajectory point data to the precision needs to form a precision support skeleton data structure. The mechanism generates an optimized query plan and executes the optimized query plan on the precision support skeleton data structure to identify at least one passing trajectory that passes the query. The mechanism then queries the trajectory point data for the at least one passing trajectory.

20 Claims, 11 Drawing Sheets

TEMPORAL PRECISION SUPPORT SKELETON 510

| TRAJECTORY | ROAD | ENTERING TIME | ENTERING MEASURE | ENDING TIME | LEAVING MEASURE | SPEED DISTRIBUTION |
|---|---|---|---|---|---|---|
| T-01 | R-01 | 2013-10-12 10:01:20 | 231m | 2013-10-12 10:02:01 | 342m | MAX/MIN SPEED |
| T-01 | R-02 | 2013-10-12 10:02:02 | 31m | 2013-10-12 10:03:03 | 172m | ... |
| T-01 | R-03 | 2013-10-12 10:03:04 | 245m | 2013-10-12 10:04:11 | 397m | ... |
| T-01 | R-04 | 2013-10-12 10:04:12 | 478m | 2013-10-12 10:05:02 | 501m | ... |

FIG. 5A

SPATIAL PRECISION SUPPORT SKELETON 520

| POI NAME | POI LOT/LAT | DISTANCE: 50m | DISTANCE: 200m | DISTANCE: 1km | ... |
|---|---|---|---|---|---|
| POI 01 | (X,Y) | R02 : (90m-130m) | R02 : (40m-150m) | | |
| | | R03 : (121m-201m) | R03 : (70m-253m) | | |
| | | | R05 : (156m-172m) | | |

FIG. 5B

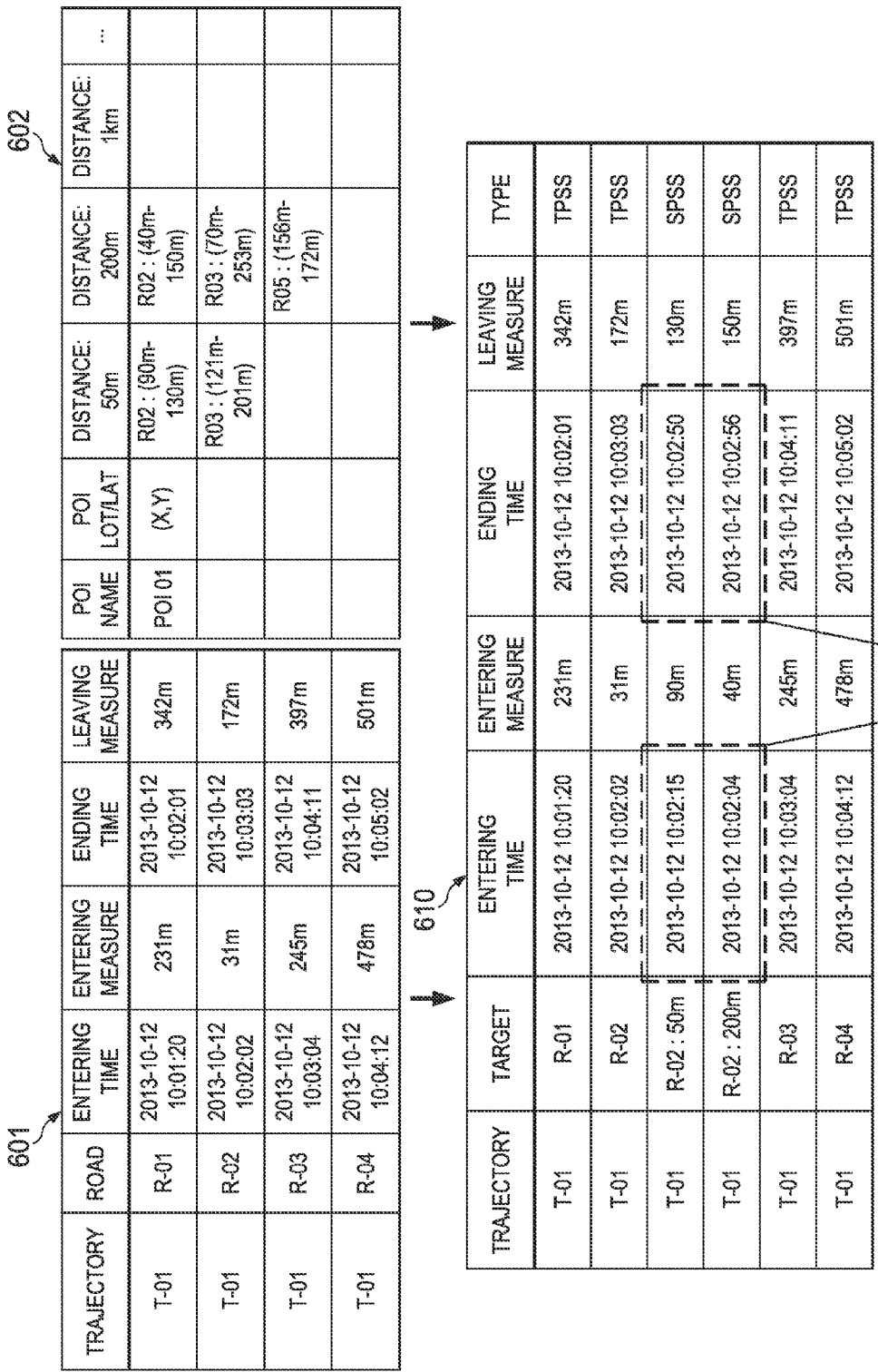

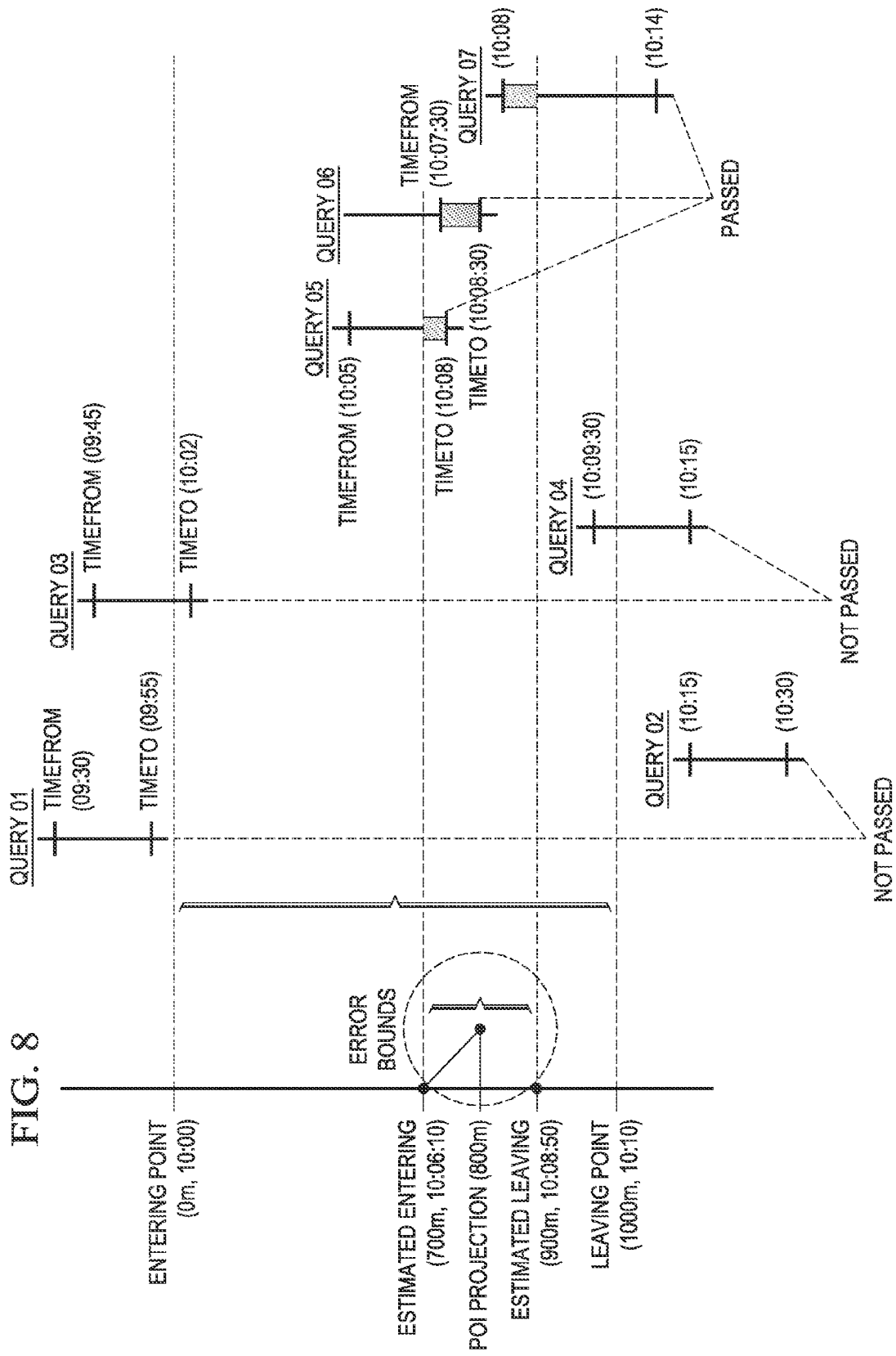

UPDATE ON PRECISION SUPPORT SKELETON 900

| TRAJECTORY | TARGET | ENTERING TIME | ENTERING MEASURE | ENDING TIME | LEAVING MEASURE | TYPE |
|---|---|---|---|---|---|---|
| T-01 | R-01 | 10:01:20 -10:01:25 (10:01:20) | 231m | 10:01:56 -10:02:01 (10:02:01) | 342m | TPSS |
| T-01 | R-02 | 10:02:02 -10:02:07 (10:02:02) | 31m | 10:02:58 -10:03:03 (10:03:03) | 172m | TPSS |
| T-01 | R-02 : 50m | 10:02:10 -10:02:20 (10:02:15) | 90m | 10:02:45 -10:03:00 (10:02:50) | 130m | SPSS |
| T-01 | R-02 : 100m | 10:02:04 -10:02:14 (10:02:09) | 70m | 10:02:47 -10:02:57 (10:02:52) | 138m | SPSS |
| T-01 | R-02 : 200m | 10:02:02 -10:02:09 (10:02:04) | 40m | 10:02:51 -10:03:01 (10:02:56) | 150m | SPSS |
| T-01 | R-03 | 10:03:04 -10:03:09 (10:03:04) | 245m | 10:03:06 -10:04:11 (10:04:11) | 397m | TPSS |
| T-01 | R-04 | 10:04:12 -10:04:17 (10:04:12) | 478m | 10:04:57 -10:05:02 (10:05:02) | 501m | TPSS |

FIG. 9

PRECISION ADAPTIVE VEHICLE TRAJECTORY QUERY PLAN OPTIMIZATION

BACKGROUND

The present application relates generally to an improved data processing apparatus and method and more specifically to mechanisms for precision adaptive vehicle trajectory query plan optimization.

Vehicle trajectory query is a fundamental function in connected vehicle solutions, while tremendous data size is a very big challenge for both query accuracy and performance. Such an application may consider gigabytes of data per day and terabytes of data per month for 10,000 vehicles.

Indexing is a widely used technology approach in both relational databases and No-SQL (no Structured Query Language) databases to accelerate queries. A database index is a data structure that improves the speed of data retrieval operations on a database table at the cost of additional writes and storage space to maintain the index data structure. Indexes are used to quickly locate data without having to search every row in a database table every time a database table is accessed. Indexes can be created using one or more columns of a database table, providing the basis for both rapid random lookups and efficient access of ordered records.

A bitmap index is a special kind of index that stores the bulk of its data as bit arrays (bitmaps) and answers most queries by performing bitwise logical operations on these bitmaps. The most commonly used indexes, such as B+trees, are most efficient if the values they index do not repeat or repeat a smaller number of times. In contrast, the bitmap index is designed for cases where the values of a variable repeat very frequently. For example, the gender field in a customer database usually contains at most three distinct values: male, female or other. For such variables, the bitmap index can have a significant performance advantage over the commonly used trees. A reverse key index (i.e., R+tree) reverses the key value before entering it in the index. E.g., the value 24538 becomes 83542 in the index. Reversing the key value is particularly useful for indexing data such as sequence numbers, where new key values monotonically increase.

SUMMARY

In one illustrative embodiment, a method, in a data processing system, is provided for precision adaptive trajectory query plan optimization. The method comprises identifying precision needs based on query instances and mapping trajectory point data to the precision needs to form a precision support skeleton data structure. The method further comprises generating an optimized query plan and executing the optimized query plan on the precision support skeleton data structure to support trajectory based queries. The method further comprises querying the trajectory point data for the at least one passing trajectory.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5A depicts a temporal precision support skeleton data structure in accordance with an illustrative embodiment;

FIG. 5B depicts a spatial precision support skeleton data structure in accordance with an illustrative embodiment;

FIG. 6 illustrates enhancing the precision support skeletons to form a spatial-temporal precision support skeleton data structure in accordance with an illustrative embodiment;

FIG. 8 illustrates an example of query internal processing for a system with precision adaptive trajectory query plan optimization in accordance with an illustrative embodiment;

FIG. 9 illustrates a data structure to include spatial-temporal precision in accordance with an illustrative embodiment;

DETAILED DESCRIPTION

Figure 1:
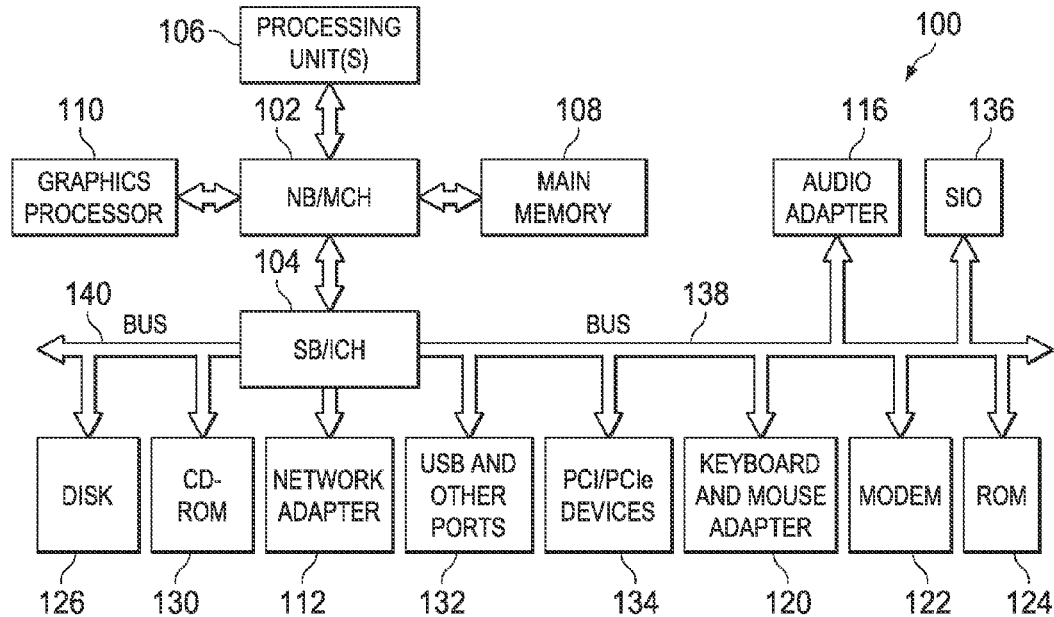
FIG. 1 is an example block diagram of a computing device in which aspects of the illustrative embodiments may be implemented.

The connected vehicle domain involves a massive amount of vehicle trajectory data. Queries of vehicle trajectory data require both high performance and scalability. For the connected vehicle domain, query plans with better scalability are critical for acceptable performance. No-SQL databases are widely used. Relational database warehouses are also widely used, especially for existing connected vehicle solutions. With R+tree indexing, data structures are fixed, and refractory is unacceptable. Indexing logic is fixed and predefined. Dynamic indexing has unacceptable performance. Therefore, the index is conventionally built statically. Indexing targets are fixed (one column or a combination of columns). Few columns can bet set with indexing.

Time-series related queries are supported well in No-SQL. An example time-series related query is, "where was a car at 20:30 last night?" The connected vehicle (CV) domain requires more queries beyond time-series. For example, a query may ask, "which cars passed a point of interest (POI) twice?" No-SQL is often used to store a massive amount of raw data. Queries using No-SQL are always too detailed or get much more data than the query actually needs.

The illustrative embodiments provide a mechanism for precision adaptive vehicle trajectory query plan optimization. The mechanism uses a smaller size abstract feature and employs a faster route algorithm to locate raw data in a larger data repository. The mechanism is made up of components for precision identification, extraction and transformation. The mechanism performs precision adaptive query plan optimization to handle vehicle trajectory queries upon various customer query needs.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM eServer™ System P® computer system, Power™ processor based computer system, or the like, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
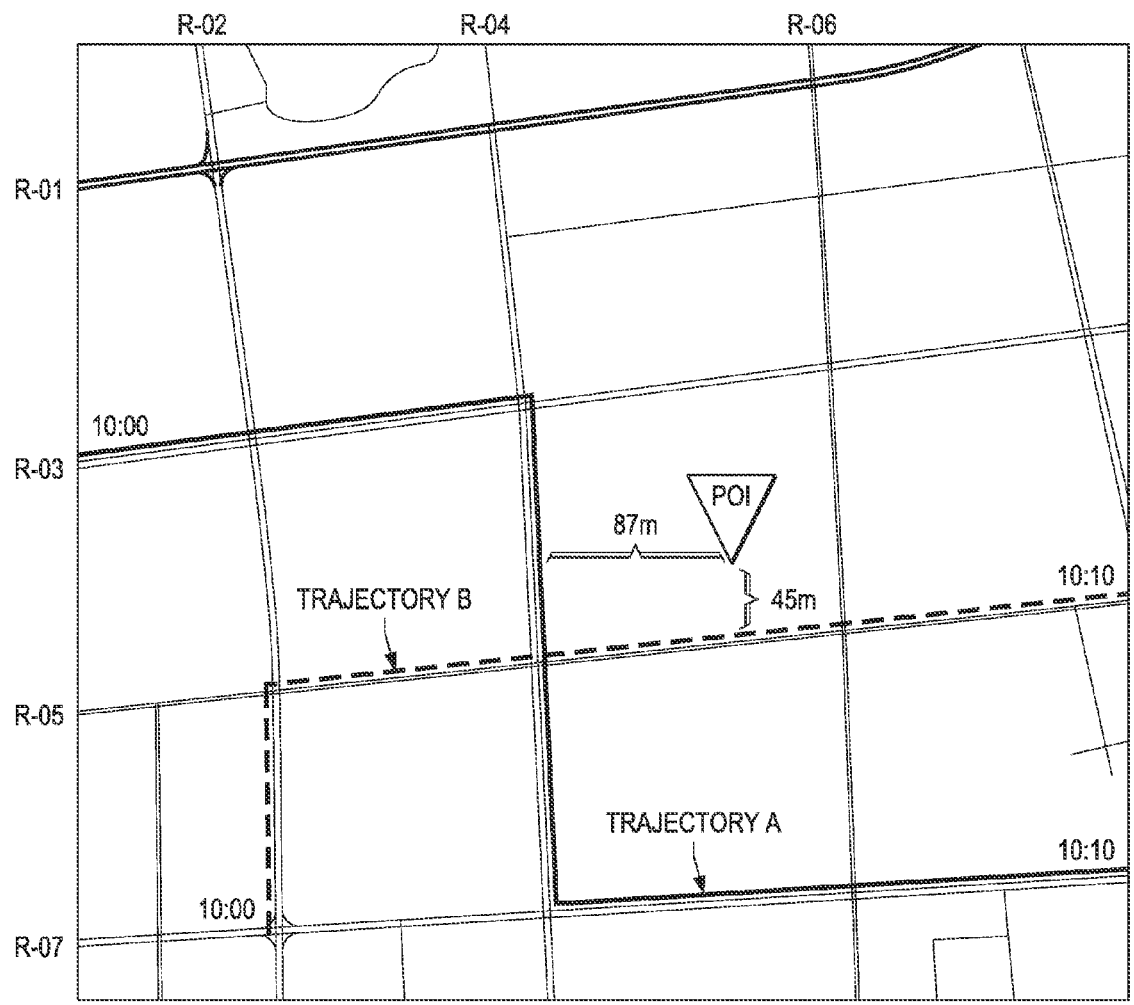
FIG. 2 depicts an example of road based indexing on spatial information.

FIG. 2 depicts an example of road based indexing on spatial information. The example shows road based indexing with roads R-01, R-02, R-03, R-04, R-05, R-6, R-07. A point of interest (POI) is 45 m from R-05 and 87 m from R-04.

Questions to query:
Which vehicle trajectory passed the POI during 10:00 to 10:10 with spatial error bounds of 50 m?
Which vehicle trajectory passed the POI during 10:00 to 10:10 with spatial error bounds of 100 m?
Indexing data:
Vehicle trajectory A: R-03, R-04, R-07
Vehicle trajectory B: R-02, R-05

A prior solution identifies roads spatially near to the POI: R-04 and R-05, gets all trajectories whose indexing data includes R-04 or R-05 and has points during 10:00 to 10:10, computes distance from each point on matched vehicle trajectory to the POI. If a vehicle trajectory has points within the given spatial error bounds of the POI during the time frame in the query, then the solution identifies the vehicle trajectory as meeting the query; otherwise, the solution skips the vehicle trajectory.

Figure 3:
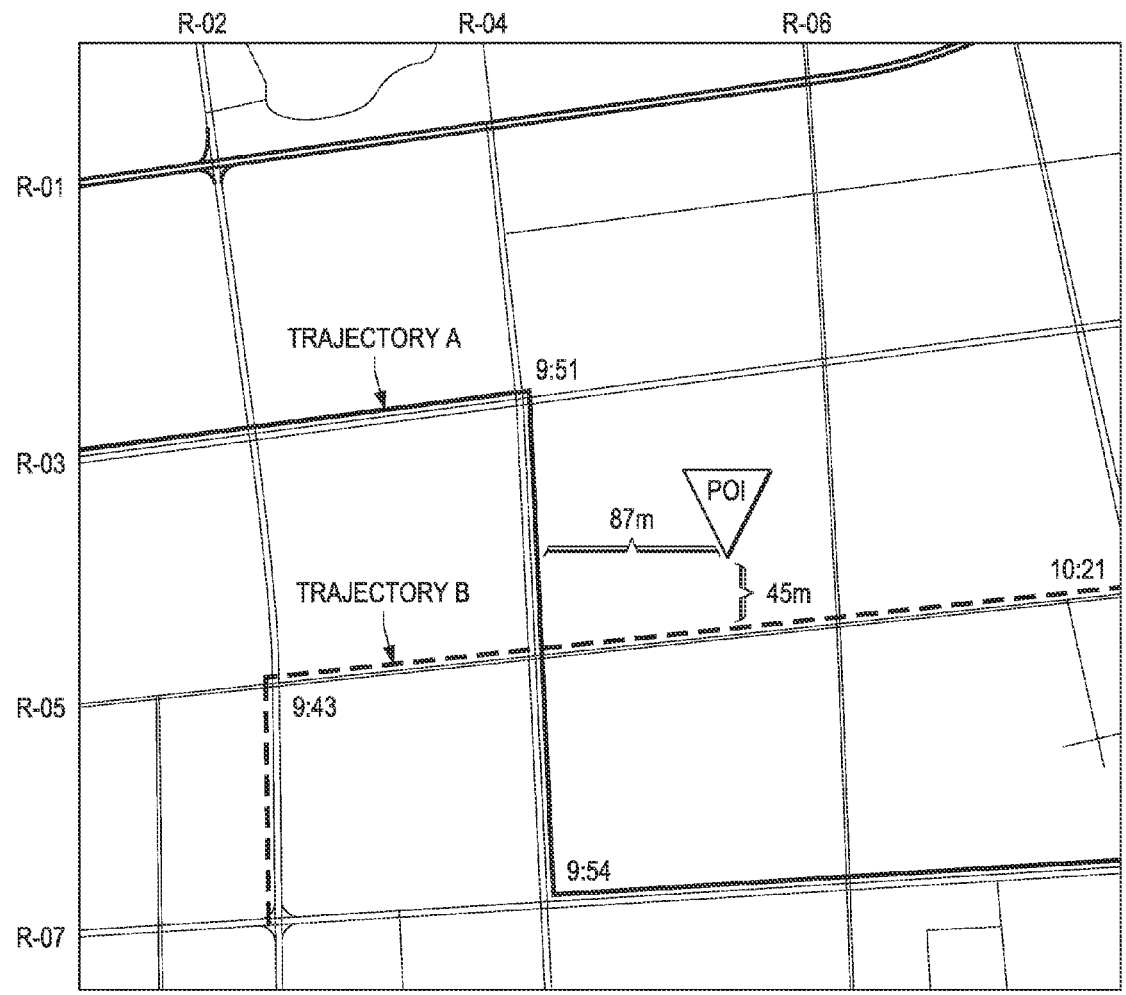
FIG. 3 depicts an example of road based indexing on temporal information.

FIG. 3 depicts an example of road based indexing on temporal information. The example shows road based indexing with roads R-01, R-02, R-03, R-04, R-05, R-06, R-07. A point of interest (POI) is 45 m from R-05 and 87 m from R-04.

Questions to query:
Which vehicle trajectory passed the POI about 10:00 with spatial error bounds of 100 m and temporal error bounds of 5 min?
Which vehicle trajectory passed the POI about 10:00 with spatial error bounds of 100 m and temporal error bounds of 30 min?
Indexing data:
Vehicle trajectory A: R-03, R-04, R-07
Vehicle trajectory B: R-02, R-05

A prior solution gets roads with projection distance to the POI less than 100 m: R-04 and R-05, gets all trajectories whose indexing data includes R-04 and R-05, and checks the timestamp of each point. If a point is within the temporal bounds, then the solution returns true; otherwise, the solution considers the next point.

Current indexing does not consider precision factors for queries. Each query may have obvious or embedded precision needs. Better handling of precision needs can greatly reduce query effort and accelerate query performance while satisfying query accuracy. The illustrative embodiments provide a mechanism to map precision needs and transform the mapping to optimize query plans. In the illustrative embodiments, the precision needs include acceptable spatial error bounds and acceptable temporal error bounds, although other error bounds may be included within the spirit and scope of the illustrative embodiments. For instance, the precision needs may include acceptable error bounds on speed, elevation, or the like. As an example of spatial error bounds, the location whose distance to a given POI is less than 50 meters can be regarded as the one on the POI. As an example of temporal error bounds, a difference of 5 minutes between a queried time and actual time can be regarded as acceptable.

Figure 4:
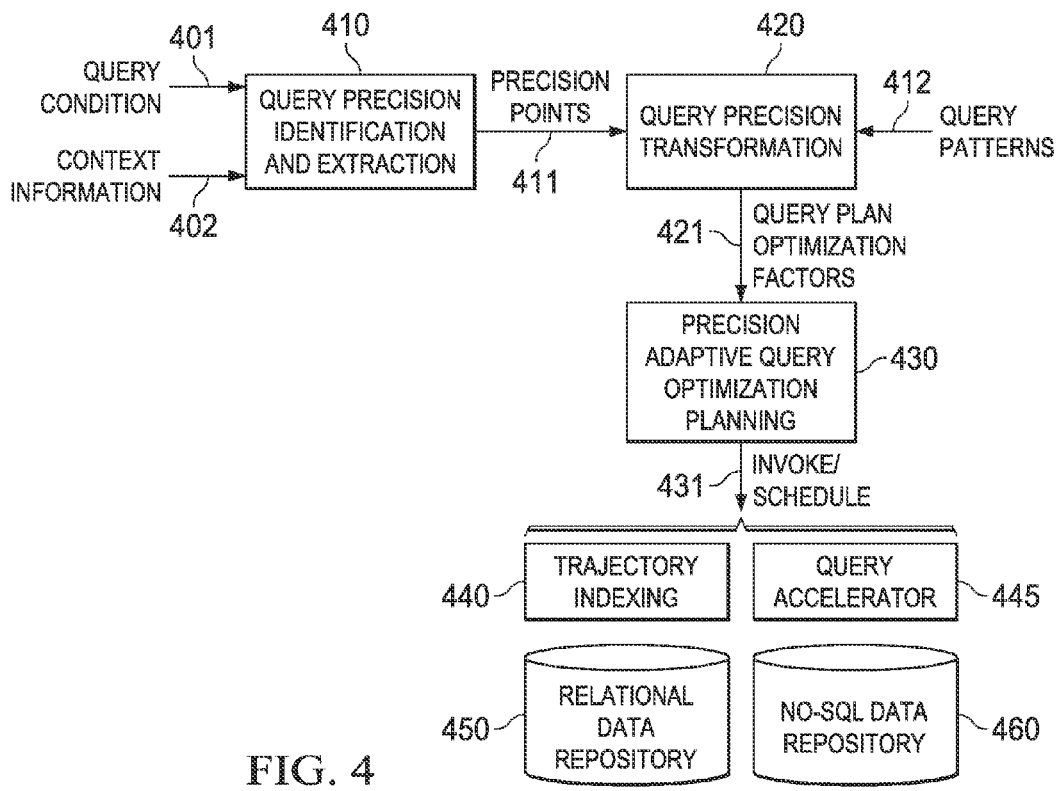
FIG. 4 is a block diagram illustrating a system for precision adaptive vehicle trajectory query plan optimization in accordance with an illustrative embodiment.

FIG. 4 is a block diagram illustrating a system for precision adaptive vehicle trajectory query plan optimization in accordance with an illustrative embodiment. A query precision identification and extraction component 410 receives query condition 401 and context information 402. The context information 402 includes static information (e.g., road network metadata, vehicle metadata, point of interest (POI) or region of interest (ROI) metadata, etc.) and dynamic information (e.g., traffic information, vehicle trajectory patterns, driving behavior, etc.). Based on query condition 401 and context information 402, query precision identification and extraction component 410 generates precision points 411.

Query precision transformation component 420 receives precision points 411 and query patterns 412. The query patterns 412 include a point query, region query, coordinate query, or the like. Based on precision points 411 and query patterns 412, query precision transformation component 420 generates query plan optimization factors 421.

Precision adaptive query optimization planning component 430 receives query plan optimization factors 421 and invokes and schedules the optimization plan. The precision adaptive query optimization plan may include vehicle trajectory indexing 440 and query accelerator 445. Vehicle trajectory indexing 440 may be road network based, grid based, etc. Query accelerator 445 includes filters, user defined fields (UDF) and/or user defined tables (UDT), etc. Precision adaptive query optimization planning component 430 invokes or schedules 431 vehicle trajectory indexing 440 and query accelerator 445 to relational database 450 and No-SQL data repository 460.

FIG. 5A depicts a temporal precision support skeleton data structure in accordance with an illustrative embodiment. The mechanism of the illustrative embodiment transforms a vehicle trajectory of a vehicle to a road passing sequence with detail of entering and leaving timestamps and offset. The mechanism builds the temporal precision support skeleton 510 once for all trajectories when loading into the repository. The temporal precision support skeleton 510 is dynamic increasing.

Each row of the table for the temporal precision support skeleton 510 comprises a segment of the vehicle trajectory on a given road. In the depicted example, the four rows correspond to segments of vehicle trajectory T-01 on different roads. In the first row, vehicle trajectory T-01 enters road R-01 at 10:01:20 on Oct. 12, 2013 at the 231 m spatial mark and leaves road R-01 at 10:02:01 on Oct. 12, 2013, at the 342 m spatial mark. The temporal precision support skeleton 510 may also include a speed distribution including the maximum and minimum speeds for each segment/row.

FIG. 5B depicts a spatial precision support skeleton data processing system in accordance with an illustrative embodiment. The mechanism of the illustrative embodiment transforms multiple popular distances to the POI to a (road: offset) range format. The spatial precision support skeleton 520 is static increasing, because the POI and popular distance are static to some extent. Intersected points on roads with other distances can be interpolated out.

In the depicted example, for POI 01, the spatial support skeleton 520 includes the longitude/latitude of the POI. Each row of the table includes ranges of roads that are within given distances (i.e., precision factors). For instance, road R-02 is within the 50 m precision factor between the 90 m and 130 m spatial marks and within the 200 m precision factor between the 40 m and 150 m spatial marks.

FIG. 6 illustrates enhancing the precision support skeletons to form a spatial-temporal precision support skeleton data structure in accordance with an illustrative embodiment. The mechanism of the illustrative embodiments combines temporal precision support skeleton 601 and spatial precision support skeleton 602 to form spatial-temporal precision support skeleton 610. Each row of the table 610 represents a segment of a vehicle trajectory T-01 that is not within a spatial precision factor or within a given spatial precision factor.

For example, the second row of temporal precision support skeleton 601 includes the segments shown in the first row of spatial precision support skeleton 602. These segments are broken out into the third and fourth rows of spatial-temporal precision support skeleton 610. The entering time and ending time of these segments may be taken from raw global positioning system (GPS) sampling data from the vehicle trajectory or may be interpolated from sparse GPS samples and/or entering the entering time and ending time from temporal precision support skeleton 601.

Figure 7A:
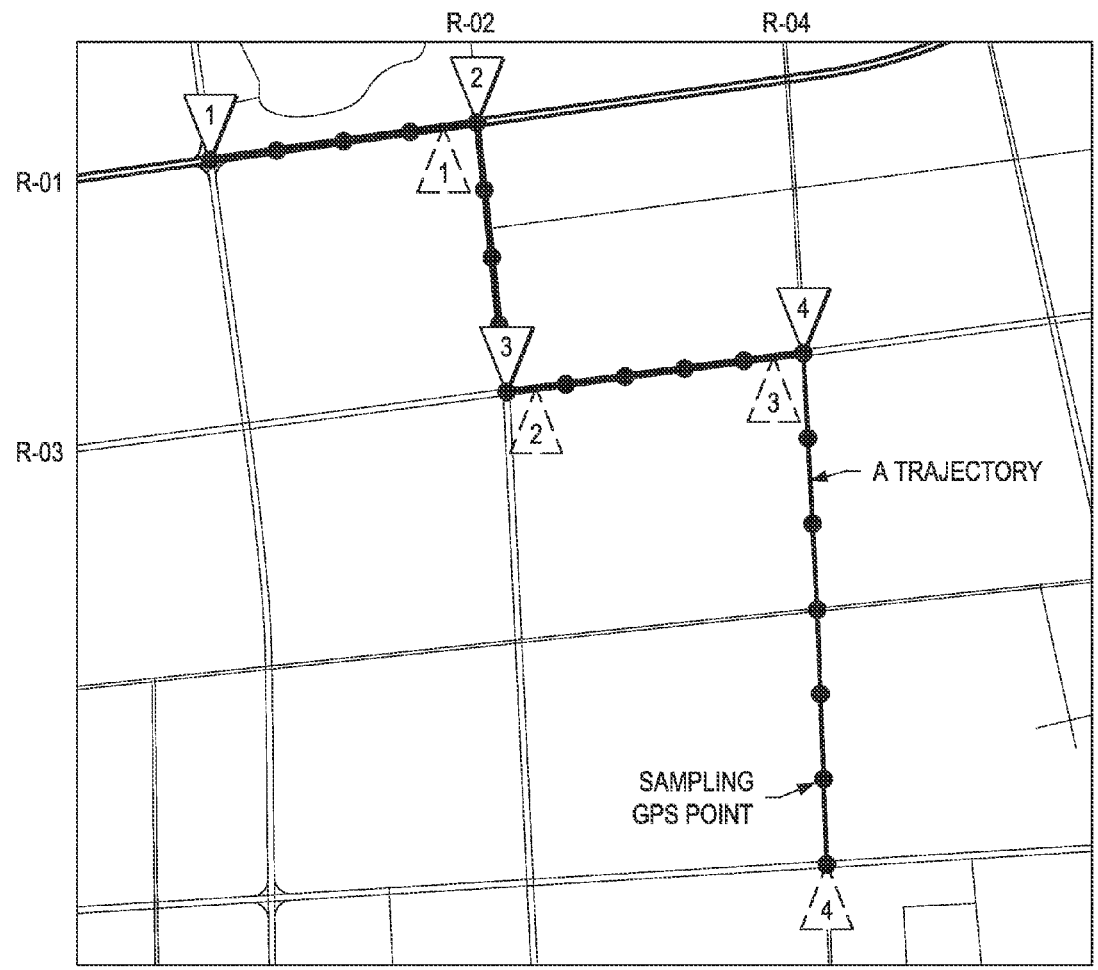
FIG. 7A illustrates temporal precision support for a vehicle trajectory in accordance with an illustrative embodiment.

FIG. 7A illustrates temporal precision support for a vehicle trajectory in accordance with an illustrative embodiment. In the depicted example, GPS data sampling points for the vehicle trajectory follow roads R-01, R-02, and R-03. As can be seen in FIG. 7A, there may be many individual GPS points, which results in a large amount of data to index. The mechanism of the illustrative embodiments reduces this data into segments of the vehicle trajectory on each road.

Figure 7B:
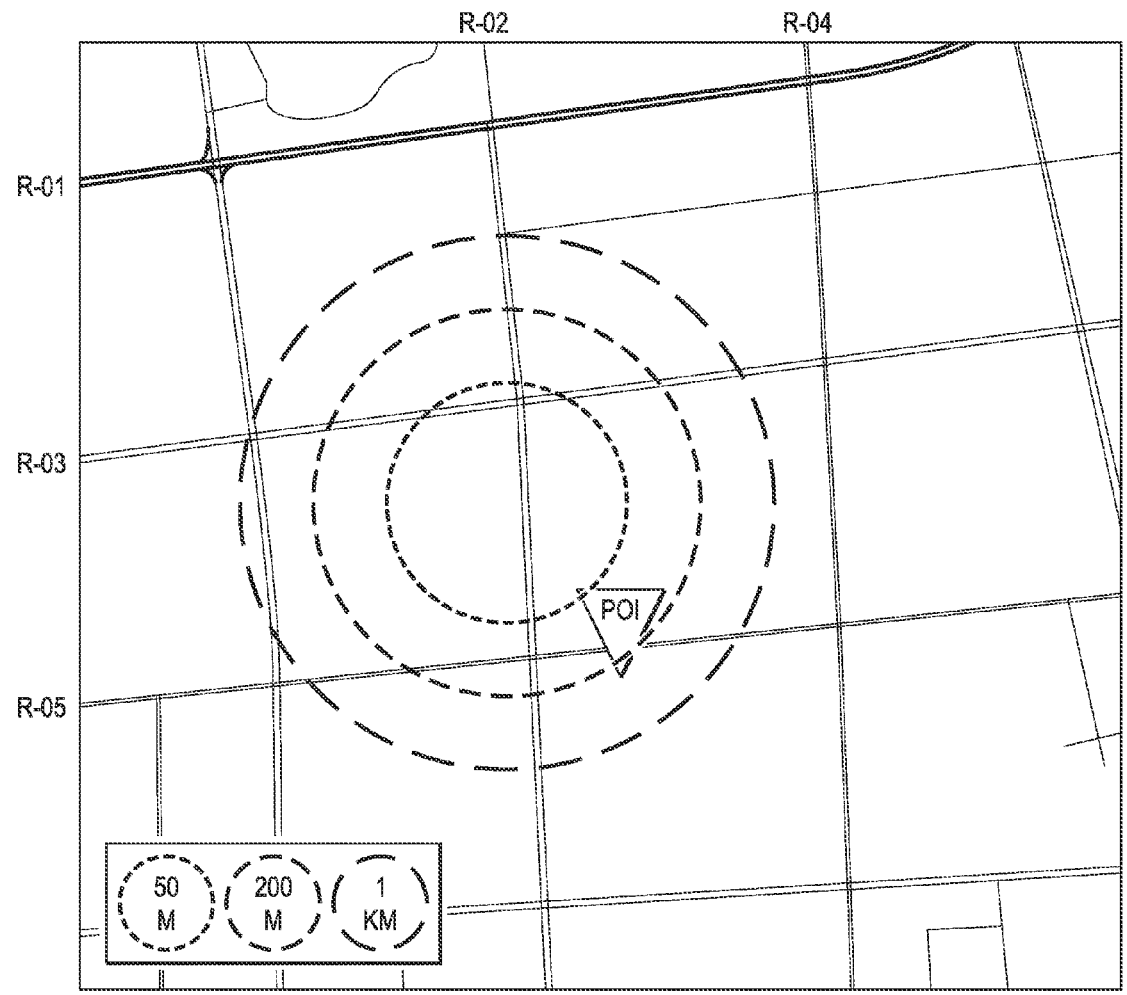
FIG. 7B illustrates spatial precision support for a vehicle trajectory in accordance with an illustrative embodiment.

FIG. 7B illustrates spatial precision support for a vehicle trajectory in accordance with an illustrative embodiment. The mechanism of the illustrative embodiments reduces the roads into segments that are within spatial precision ranges. In the depicted example, the mechanism shows segments of the roads that are within 50 m, 200 m, or 1 km.

Figure 7C:
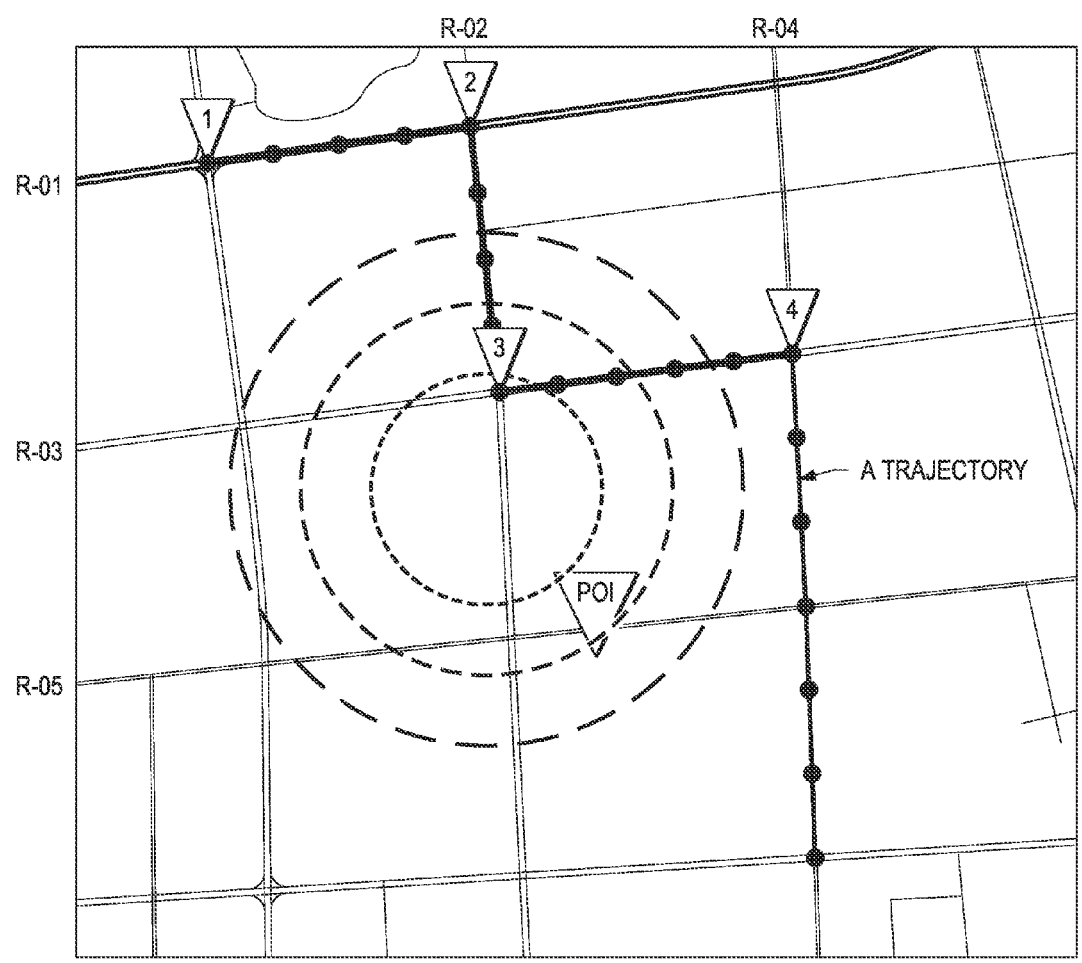
FIG. 7C illustrates spatial-temporal precision support for a vehicle trajectory in accordance with an illustrative embodiment.

FIG. 7C illustrates spatial-temporal precision support for a vehicle trajectory in accordance with an illustrative embodiment. The spatial-temporal precision support is a combination of the temporal precision support and the spatial precision support.

FIG. 8 illustrates an example of query internal processing for a system with precision adaptive trajectory query plan optimization in accordance with an illustrative embodiment. For a given vehicle, the mechanism of the illustrative embodiments queries whether it passed a given point of interest (POI) within a certain time range. The POI is projected to be at the 800 m spatial marker on the mapped road link. For a mapped road link, a vehicle will pass if the vehicle trajectory is at particular spatial markers (700 m to 900 m) and within a given time range (10:06:10 to 10:08:50).

Each query is for a vehicle trajectory with entering and leaving timestamps. For query 01 from time 9:30 to time 9:55, the vehicle trajectory does not enter within the error bounds, and the query does not pass. As seen in FIG. 8, queries 01, 02, 03, and 04 do not pass, and there is no need to query the raw data for these queries. On the other hand, for queries 05, 06, and 07, the vehicle trajectory does enter within the error bounds for at least a portion of the time range; therefore, the query exact passing time depends on the temporal precision needs.

FIG. 9 illustrates a data structure to include spatial-temporal precision in accordance with an illustrative embodiment. The mechanism of the illustrative embodiments transforms queries on vehicle trajectory data to queries on a spatial-temporal precision support skeleton data structure to accelerate the query and to satisfy accuracy to some extent. The mechanism updates the precision support skeleton without considering more GPS data points.

For example, for a given vehicle, the mechanism determines when the vehicle passed a given POI and considers a range with distance 100 m as on-site and the result timestamp can have 5 seconds as the temporal error bounds. For the spatial error bounds of 100 m, the mechanism interpolates on the existing skeleton data of 50 m and 200 m. For the temporal error bounds of 5 s, the mechanism enlarges the mapped time range on the road and also performs road boundary checking.

As shown in FIG. 9, the updated temporal-spatial precision support skeleton data structure 900 includes a new row for a segment of road R-02 that is within the spatial error bounds of 100 m of the point of interest (POI). In this case, the vehicle trajectory is on road R-02 within 100 m of the POI with an interpolated entering time of 10:02:09 (±5 s), an entering measure of 70 m, an ending time of 10:02:52 (±5 s), and a leaving measure of 138 m. The process for answering the query is greatly optimized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 10:
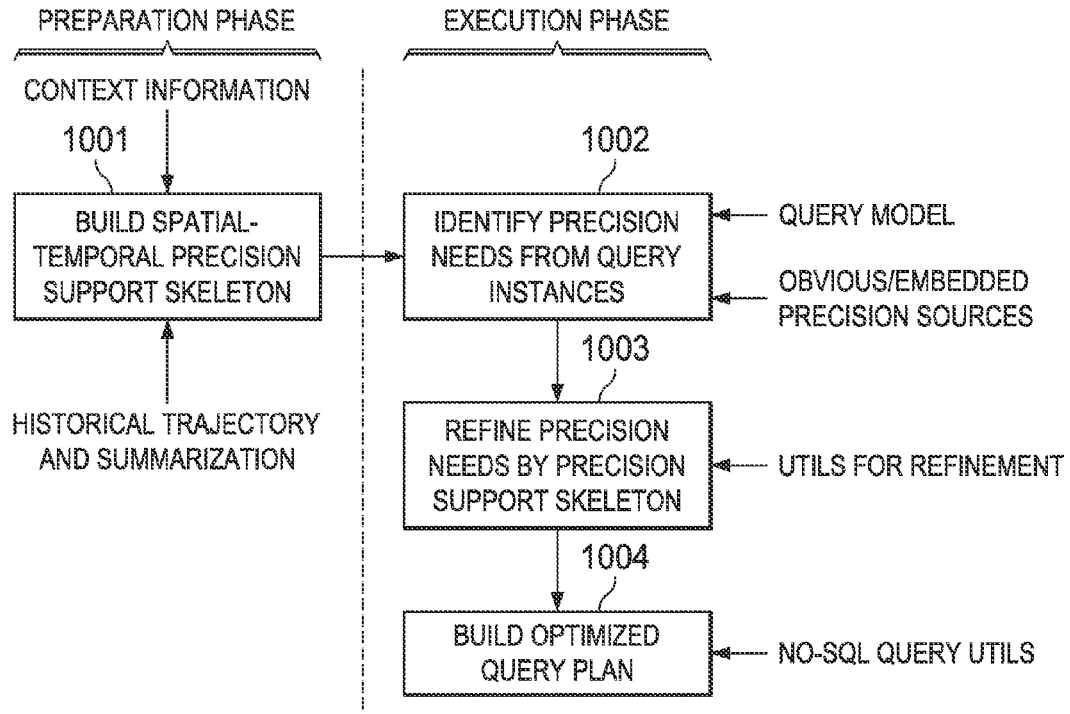
FIG. 10 is a flowchart illustrating operation of a system for precision adaptive trajectory query plan optimization in accordance with an illustrative embodiment.

FIG. 10 is a flowchart illustrating operation of a system for precision adaptive trajectory query plan optimization in accordance with an illustrative embodiment. In a preparation phase, the system builds a spatial-temporal precision support skeleton data structure (block 1001). The system builds the data structure based on context information and historical vehicle trajectory data and summarization. The context information may include road network metadata, vehicle metadata, point of interest (POI) and region of interest (ROI) metadata, etc. The historical trajectory and summarization information may include traffic points, trajectory patterns, driving behavior, etc.

In an execution phase, the system identifies precision needs from query instances (block 1002). The system identifies the precision needs from a query model and obvious/embedded precision sources. The query model may include a point query, a region query, a coordinate query, etc. The precision sources may include query conditions, query internal processing, etc.

The system then refines the precision needs by the precision support skeleton data structure (block 1003) using utilities for refinement. The utilities may include, for example, map matching, road network matching, coordinate transformation, etc. The system then builds an optimized query plan (block 1004). The system uses No-SQL query utilities to build the query plan. The No-SQL query utilities may include, for example, indexing, filtering, user defined fields (UDF) and/or user defined tables (UDT), etc.

Figure 11:
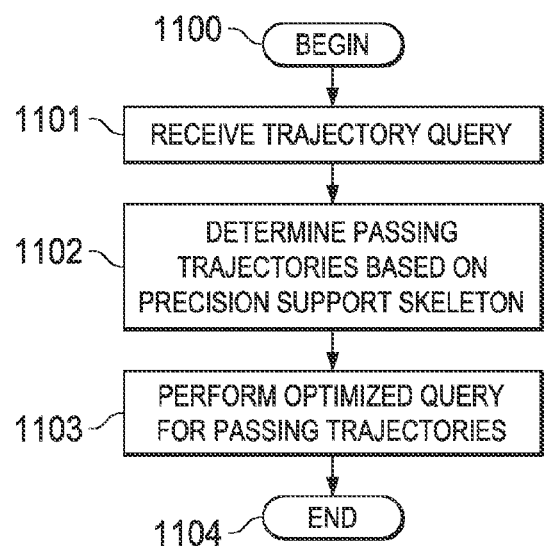
FIG. 11 is a flowchart illustrating operation of performing a query with precision adaptive trajectory query plan optimization in accordance with an illustrative embodiment.

FIG. 11 is a flowchart illustrating operation of performing a query with precision adaptive trajectory query plan optimization in accordance with an illustrative embodiment. Operation begins (block 1100), and the system receives a trajectory query (block 1101). The system determines passing trajectories based on the precision support skeleton data structure (block 1102). The system performs an optimized query for the passing trajectories (block 1103). The system uses the precision support skeleton data structure to narrow the query down to segments of the trajectory and uses query utilities to query exact data points based on the precision needs of the query. Thereafter, operation ends (block 1104).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for precision adaptive trajectory query plan optimization, the method comprising:
    identifying, by the data processing system, precision needs based on query instances, wherein the precision needs specify acceptable error bounds, wherein the precision needs include acceptable spatial error bounds and acceptable temporal error bounds;
    mapping, by the data processing system, trajectory point data to the precision needs to form a precision support skeleton data structure, wherein the trajectory point data comprise GPS data sampling points for vehicle trajectories, wherein the precision support skeleton data structure comprises a temporal precision support skeleton table and a spatial precision support skeleton table, wherein the temporal precision support skeleton table transforms each vehicle trajectory of each vehicle to a road passing sequence with detail of entering and leaving timestamps and offset, wherein the spatial precision support skeleton table transforms multiple popular distances to each point of interest to a road and offset range format;
    generating, by the data processing system, an optimized query plan;
    receiving, by the data processing system, a query;
    executing, by the data processing system, the optimized query plan on the precision support skeleton data structure to identify at least one passing trajectory that passes the query; and
    querying, by the data processing system, the trajectory point data for the at least one passing trajectory.

2. The method of claim 1, wherein identifying precision needs comprises identifying the precision needs based on context information, wherein the context information comprises static information and dynamic information.

3. The method of claim 2, wherein the static information comprises road network metadata, vehicle metadata, or point of interest (POI) or region of interest (ROI) metadata.

4. The method of claim 2, wherein the dynamic information comprises traffic information, vehicle trajectory patterns, or driving behavior.

5. The method of claim 1, wherein mapping trajectory point data to the precision needs comprises generating query plan optimization factors based on a set of query patterns.

6. The method of claim 5, wherein the set of query patterns comprises at least one of a point query, a region query, or a coordinate query.

7. The method of claim 1, wherein the query optimization plan comprises vehicle trajectory indexing and a query accelerator.

8. The method of claim 7, wherein the vehicle trajectory indexing is road network based or grid based.

9. The method of claim 7, wherein the query accelerator comprises at least one of filters, user defined fields (UDF), or user defined tables (UDT).

10. The method of claim 7, wherein executing the optimized query plan on the precision support skeleton data structure comprises applying the vehicle trajectory indexing and the query accelerator to a relational database and a No-SQL data repository.

11. The method of claim 1, wherein each row of the temporal precision support skeleton table comprises a segment of a vehicle trajectory on a given road.

12. The method of claim 11, wherein each row of the spatial precision support skeleton table includes a range of a road that is within a given distance of a given point of interest.

13. The method of claim 12, wherein mapping the trajectory point data to the precision needs to form the precision support skeleton data structure comprises combining the temporal precision support skeleton table and the spatial precision support skeleton table to form a spatial-temporal precision support skeleton table.

14. The method of claim 13, wherein each row of the spatial-temporal precision support skeleton table represents a segment of a vehicle trajectory that is within a given spatial precision factor or not within the given spatial precision factor.

15. The method of claim 14, further comprising determining an entering time that the vehicle trajectory entered the given spatial precision factor and an ending time that the vehicle trajectory left the given spatial precision factor.

16. The method of claim 15, wherein determining the entering time and the ending time comprises determining the entering time or the ending time from the trajectory point data.

17. The method of claim 15, wherein determining the entering time and the ending time comprises determining the entering time or the ending time by performing interpolation based on the trajectory point data.

18. The method of claim 13, wherein generating the optimized query plan comprises transforming queries on the vehicle trajectory data to queries on the precision support skeleton and updating the precision support skeleton without considering more vehicle trajectory data.

19. A computer program product comprising a computer readable storage medium having a computer readable program stored therein, wherein the computer readable program, when executed on a computing device, causes the computing device to:
   identify precision needs based on query instances, wherein the precision needs specify acceptable error bounds, wherein the precision needs include acceptable spatial error bounds and acceptable temporal error bounds;
   map trajectory point data to the precision needs to form a precision support skeleton data structure, wherein the trajectory point data comprise GPS data sampling points for vehicle trajectories, wherein the precision support skeleton data structure comprises a temporal precision support skeleton table and a spatial precision support skeleton table, wherein the temporal precision support skeleton table transforms each vehicle trajectory of each vehicle to a road passing sequence with detail of entering and leaving timestamps and offset, wherein the spatial precision support skeleton table transforms multiple popular distances to each point of interest to a road and offset range format;
   generate an optimized query plan;
   receive a query;
   execute the optimized query plan on the precision support skeleton data structure to identify at least one passing trajectory that passes the query; and
   query the trajectory point data for the at least one passing trajectory.

20. An apparatus comprising:
   a processor; and
   a memory coupled to the processor, wherein the memory comprises instructions which, when executed by the processor, cause the processor to:
   identify precision needs based on query instances, wherein the precision needs specify acceptable error bounds, wherein the precision needs include acceptable spatial error bounds and acceptable temporal error bounds;
   map trajectory point data to the precision needs to form a precision support skeleton data structure, wherein the trajectory point data comprise GPS data sampling points for vehicle trajectories, wherein the precision support skeleton data structure comprises a temporal precision support skeleton table and a spatial precision support skeleton table, wherein the temporal precision support skeleton table transforms each vehicle trajectory of each vehicle to a road passing sequence with detail of entering and leaving timestamps and offset wherein the spatial precision support skeleton table transforms multiple popular distances to each point of interest to a road and offset range format;
   generate an optimized query plan;
   receive a query;
   execute the optimized query plan on the precision support skeleton data structure to identify at least one passing trajectory that passes the query; and
   query the trajectory point data for the at least one passing trajectory.

* * * * *